US006672668B1

(12) United States Patent
Boruta et al.

(10) Patent No.: US 6,672,668 B1
(45) Date of Patent: Jan. 6, 2004

(54) EXAMINATION CHAIR

(75) Inventors: Ivan Boruta, Ostrava-Poruba (CZ); Vilem Neuman, Lubina (CZ)

(73) Assignee: Maquet GmbH & Co. KG., Rastatt (DE)

( * ) Notice: Subject to any disclaimer, the term of this patent is extended or adjusted under 35 U.S.C. 154(b) by 0 days.

(21) Appl. No.: 09/831,618

(22) PCT Filed: Nov. 17, 1999

(86) PCT No.: PCT/EP99/08814

§ 371 (c)(1), (2), (4) Date: Aug. 29, 2001

(87) PCT Pub. No.: WO00/28938

PCT Pub. Date: May 25, 2000

(30) Foreign Application Priority Data

Nov. 18, 1998 (DE) .......................................... 198 53 271

(51) Int. Cl.[7] .................................................. B60N 2/02

(52) U.S. Cl. .......................... 297/354.12; 5/616; 5/617; 297/316; 297/330

(58) Field of Search ............................ 297/68, 69, 316, 297/325, 330, 340, 423.3, 354.12, 354.13, 440.24; 5/616, 617; 248/161, 405, 157, 396, 397, 371

(56) References Cited

U.S. PATENT DOCUMENTS 3,984,146 A * 10/1976 Krestel et al.
5,015,035 A * 5/1991 Stoeckl et al.
5,253,922 A * 10/1993 Corlett
5,342,114 A * 8/1994 Burke et al.
5,390,979 A * 2/1995 Corlett
5,628,546 A * 5/1997 Boetzkes
5,992,934 A * 11/1999 Gehrig et al.
6,173,461 B1 * 1/2001 Alexander
6,237,172 B1 * 5/2001 Morgan, Sr.

FOREIGN PATENT DOCUMENTS

| | | | |
|---|---|---|---|
| DE | 19 40 646 | 2/1971 | .......... A61G/15/00 |
| DE | 24 18 524 | 10/1974 | .......... A61G/15/00 |
| DE | 25 08 034 | 9/1976 | .......... A61G/15/00 |
| DE | 94 10 779 U | 10/1994 | .......... A61G/15/04 |
| FR | 2 150 101 | 3/1973 | .......... A61G/15/00 |

* cited by examiner

*Primary Examiner*—Peter M. Cuomo
*Assistant Examiner*—Stephen Vu
(74) *Attorney, Agent, or Firm*—McCormick, Paulding & Huber LLP

(57) ABSTRACT

An examination chair for gynecological and urological examinations, comprising a chair part (14) with a seat (22) and a backrest (24), and a support column (12) that has a column head which can be adjusted heightwise through an actuator (20), on which the chair section is mounted, the backrest (24) being pivotally mounted on the column head (18) for movement about a horizontal pivot axis (28) and being so pivotable by a drive mechanism (30), the seat (22) being pivotally mounted on the backrest (24) for movement about a second pivot axis (36) parallel to the axis (28) and also connected to the backrest (24) by a four-corner linkage (38) that includes both pivot axes (28,36), a link axis (40) fixed to the seat, and a free link axis (42), the link (46) of the linkage (38) connecting the first pivot axis (28) to the free axis (42) being a first lever arm of a two-armed control lever (48) and cooperating with a stop (54) secured to the column to determine the fundamental position of the seat (22), the second lever arm (50) of the control lever (48) being designed to cooperate with a stop (60) on the backrest.

3 Claims, 5 Drawing Sheets

EXAMINATION CHAIR

BACKGROUND OF THE INVENTION

1. Technical Field

The invention concerns an examination chair for gynecological and urological examinations including a chair portion with a seat and a backrest as well as a supporting column with a column head height adjustable by way of an adjusting drive, on which column head the chair portion is arranged, with means being provided for adjusting the seat and the backrest relative to the supporting column.

2. Background of the Prior Art

From DE 25 08 034 C2 an examination chair for gynecological and urological examinations is known in which a chair portion with a backrest is pivotally connected with a supporting frame for movement about a fixed tilt axis and is pivoted in its entirety with the help of an adjusting cylinder. The adjusting cylinder is connected on one side to the support frame and on the other side directly to the backrest of the chair portion. The seat as to its position relative to the backrest remains unchanged, but the seat can be swung downwardly when the backrest is positioned nearly horizontally. A simultaneous adjustment of the backrest and the seat relative to the supporting column and relative to one another is not provided.

In the case of operating tables, it is known to adjust individual sections of the patient support surface relative to one another by individual drives. This requires a relatively high technical expense.

BRIEF SUMMARY OF THE INVENTION

The invention has as its basic object the provision of an examination chair of the previously mentioned kind whereby with relatively small technical expense the backrest and seat can be synchronously adjusted relative to the supporting column and relative to one another.

This object is solved in accordance with the invention in that the backrest is pivotably supported on the column for movement about a horizontal first pivot axis and is so pivoted by a pivot drive, that the seat is pivotably supported on the backrest for pivotal movement about a second pivot axis parallel to the first pivot axis and is further connected with the backrest by means of a four-corner linkage which includes the two pivot axes, a link axis fixed relative to the seat, and a free link axis, and wherein the link of the four-corner linkage which connects the first pivot axis with the free link axis is a first lever arm of a two arm control lever, which first lever arm cooperates with a stop fixed to the column for establishing a fundamental position of the seat, while the second lever arm of the control lever for adjustment of the seat is designed for cooperation with a stop fixed to the backrest.

The fundamental position of the seat is for example a horizontal position. Relative to this fundamental position of the seat, the backrest can be adjusted through a given angular range, with the seat because of its connection with the backrest through the four-corner linkage being shifted in its fundamental horizontal position. Not until the backrest is tilted rearwardly through a given angle does the stop fixed to the backrest come into engagement with the second lever arm of the control lever so as to move, through the control lever and the four-corner linkage the seat synchronously with the backrest.

A preferred embodiment provides that the pivotal movement of the control lever from its position which corresponds to the fundamental position of the seat is limited by a second stop fixed to the column and that the stop fixed to the backrest is pivotal against a spring force. This gives the possibility of holding the seat in a given pivoted position by means of the stop fixed to the column, while the backrest can be moved beyond this position by the pivoting of the stop fixed to the backrest, so that the seat and the backrest can, for example, be brought into an almost stretched out position.

The pivoting drive is preferably a linear drive, for example a spindle drive, one end of which is connected with the column head and the other end of which is pivotally connected with the backrest.

In this way it is possible with a single pivoting drive to adjust the seat and backrest to different positions relative to the supporting column and relative to one another.

Further features and advantages of the invention will be apparent from the following description which in connection with the accompanying drawing, explain the invention by way of an exemplary embodiment. The drawings are:

DETAILED DESCRIPTION OF THE INVENTION

Figure 1:
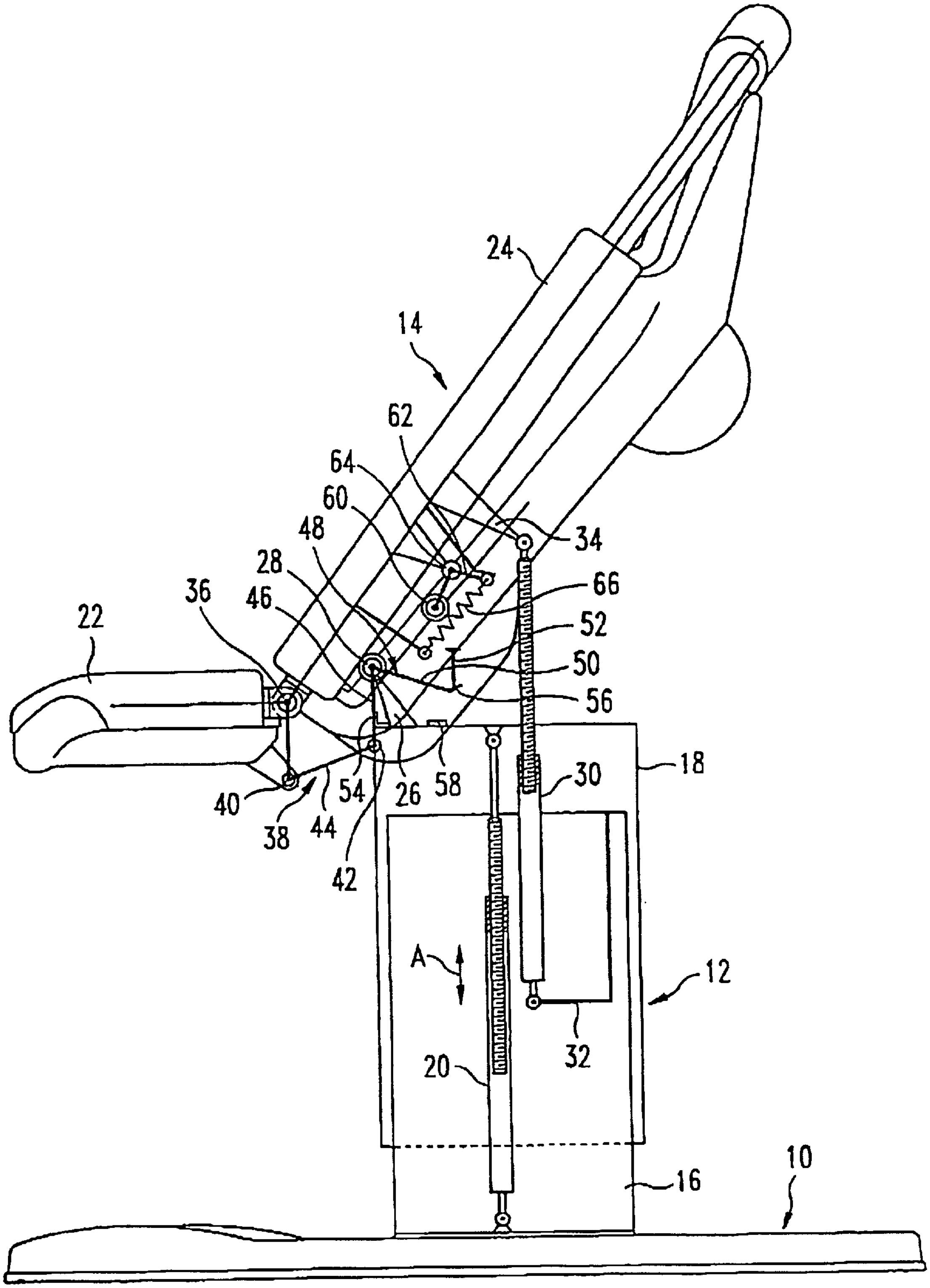
FIG. 1, a schematic side view of an examination chair in a first position of the seat and backrest, FIG. 2, a view corresponding to FIG. 1, but with the seat and backrest in a second position, FIG. 3, a view corresponding to FIG. 1, but with the seat and backrest in a third position, FIG. 4, a view corresponding to FIG. 1, but with the seat and backrest in a fourth position, and FIG. 5, a diagram for explaining the region in which either only the backrest or the backrest together with the seat is pivoted.

The examination chair illustrated in FIG. 1 includes a base part 10 to which is rigidly connected a supporting column 12, which column carries a chair part indicated generally at 14. The supporting column has a guide body 16 rigidly connected with the base part 10 and a column head 18 guided telescopically on the guide body 16. The guide body 16 and the column head 18 can for example be formed cylindrically. The column head 18 can be adjusted up and down relative to the guide body 16 through a first spindle drive 20 in the direction of the double arrow A. The chair portion 14 has a seat 22 and a backrest 24. The backrest 24 is pivotally supported by a support head 26, fixedly connected with the column head 18, for movement about a horizontal pivot axis 28 and can be so pivoted by a spindle drive 30, forming a pivot drive, about the axis 28. The spindle drive 30 is on one side pivotably connected through a holder 32 with the column head 18 and on the other side with an arm 34 fixed to the backrest.

The seat 22 is pivotably connected to the lower end of the backrest 24 for movement about a second pivot axis 36 parallel to the pivot axis 28. The seat 22 is further connected with the backrest 24 by means of a four-corner linkage 38, which includes a further link axis 40 fixed to the seat and a free link axis 42, which axis 42 is connected with the link axis 40 by means of a link 44 and with the first pivot axis 28 through a lever arm 46.

The lever arm 46 is part of a two-arm control lever indicated generally at 48, the other lever arm 50 of which is positioned at an angle of less than 90° to the first lever arm 46, and which lever arm 50 is in the form of an angularly bent lever the free leg 52 of which is arranged at least nearly parallel to the first lever arm 46.

In FIG. 1, the lever arm 46 of the control lever 48 lies against a first stop 54 fixed to the column head. The second lever arm 50 has on its angular vertex a stop surface 56 intended to engage a second stop 58 fixed to the column head. The free end of the lever leg 52 is intended to cooperate with a stop 60 which is formed by a roller and which is arranged at the free end of one lever arm of a bent lever 62, which is pivotally supported for movement about an axis 64 on the backrest 24 and is biased by a compression spring 66 counterclockwise to the position illustrated in FIG. 1. The compression spring 66 in this case works against a counter support fixed to the backrest.

By way of FIGS. 2–5 in the following the kinematics of the adjustment of the seat and the backrest of the so far described examination chair will be explained.

Figure 2:
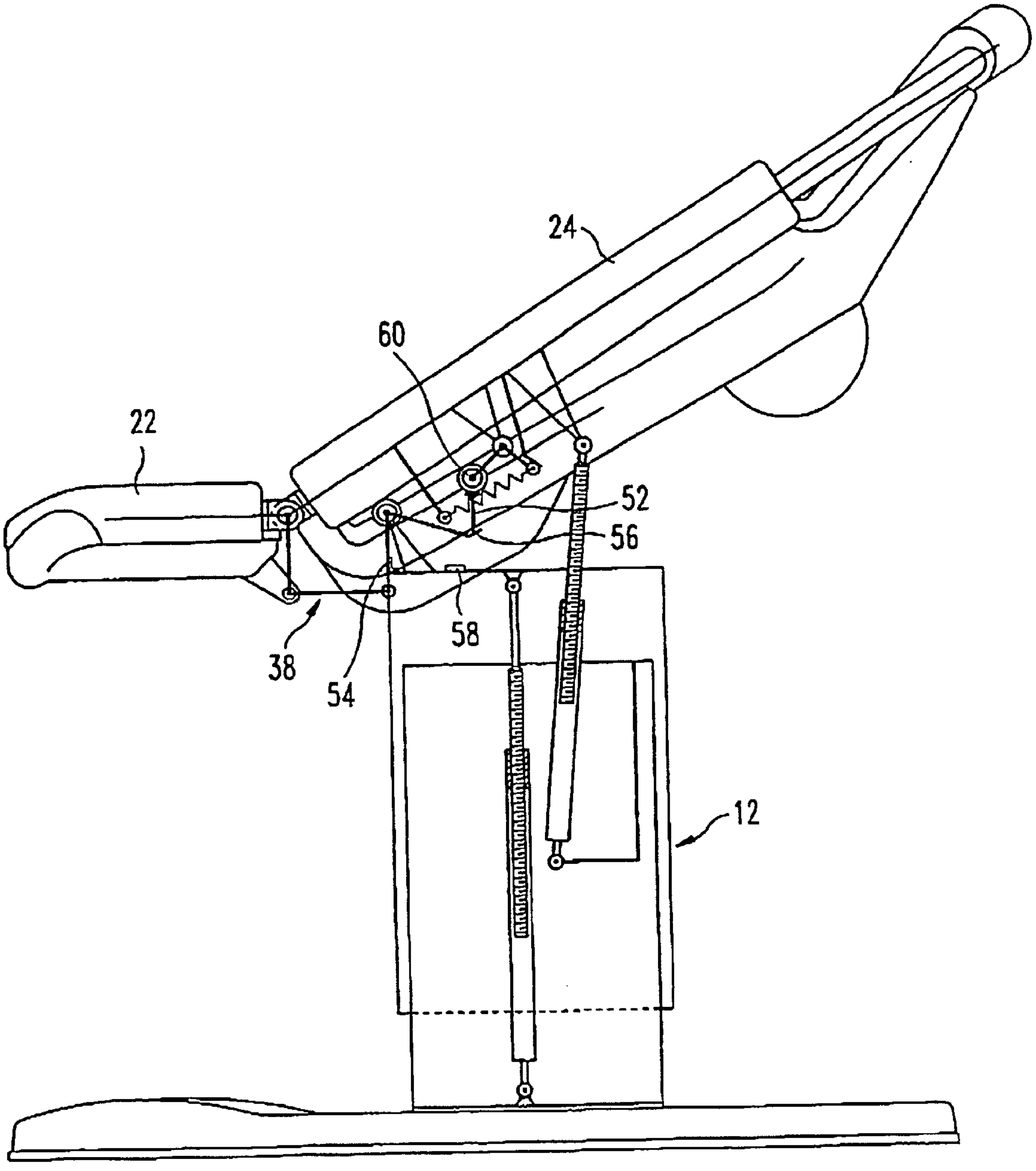

FIG. 2 shows the examination chair in a position in which the backrest 24, in comparison to the position according to FIG. 1, has been pivotally moved clockwise about the axis 28 by the shortening of the linear drive 30 and indeed moved so far that the end of the lever leg 52 is pushed against the stop 60 on the backrest. With the movement of the backrest from the position of FIG. 1 to the position of FIG. 2 the seat 22 retains its horizontal position, because of the linkage connection between the seat 22 and the backrest 24, no possibility exists for pivoting of the seat 22. On the other hand, the lever arm 46 lying on the stop 54 of the column head 18 holds the seat surface 22 in the by horizontal position through the four-corner linkage 38, with the seat 22 being only pushed leftwardly horizontally by the linkage 38 from the FIG. 1 position.

Figure 3:
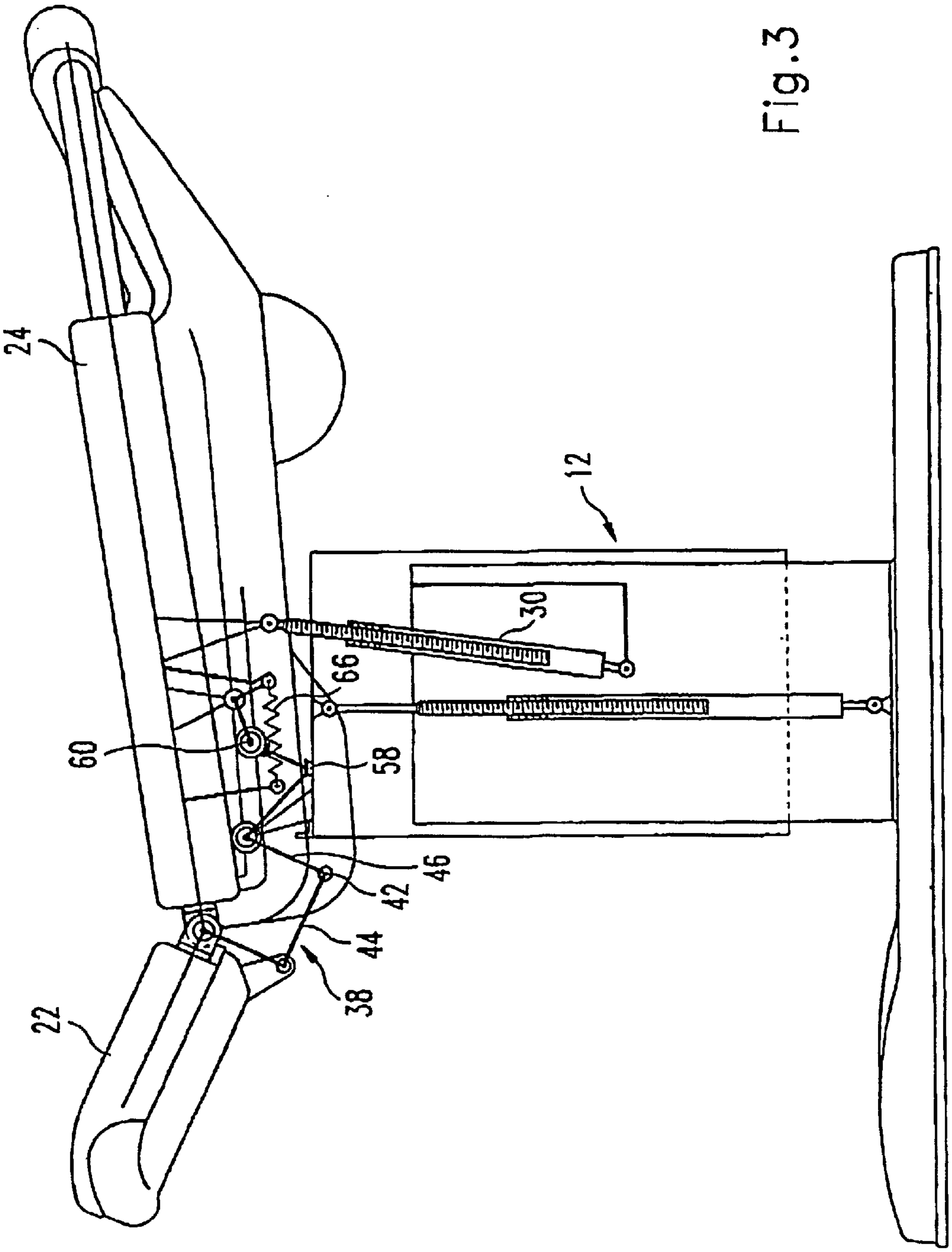

If the backrest 24 is further pivoted in the clockwise direction from the position illustrated in FIG. 2, by further shortening of the linear drive 30, the stop 60 fixed to the backrest presses on the free end of the lever leg 52 of the control lever 48 and pivots the lever 48 about the axis 28 so that now the backrest 24 and seat 22, without changing their relative position, are moved synchronously about the axis 28 until the position of FIG. 3 is reached. In this position, the surface 56 of the control lever 48 comes into engagement with the second stop 58 fixed to the column head so that a further pivotal movement of the control lever 48, and therewith also of the seat 22, in the clockwise direction is prevented.

Figure 4:
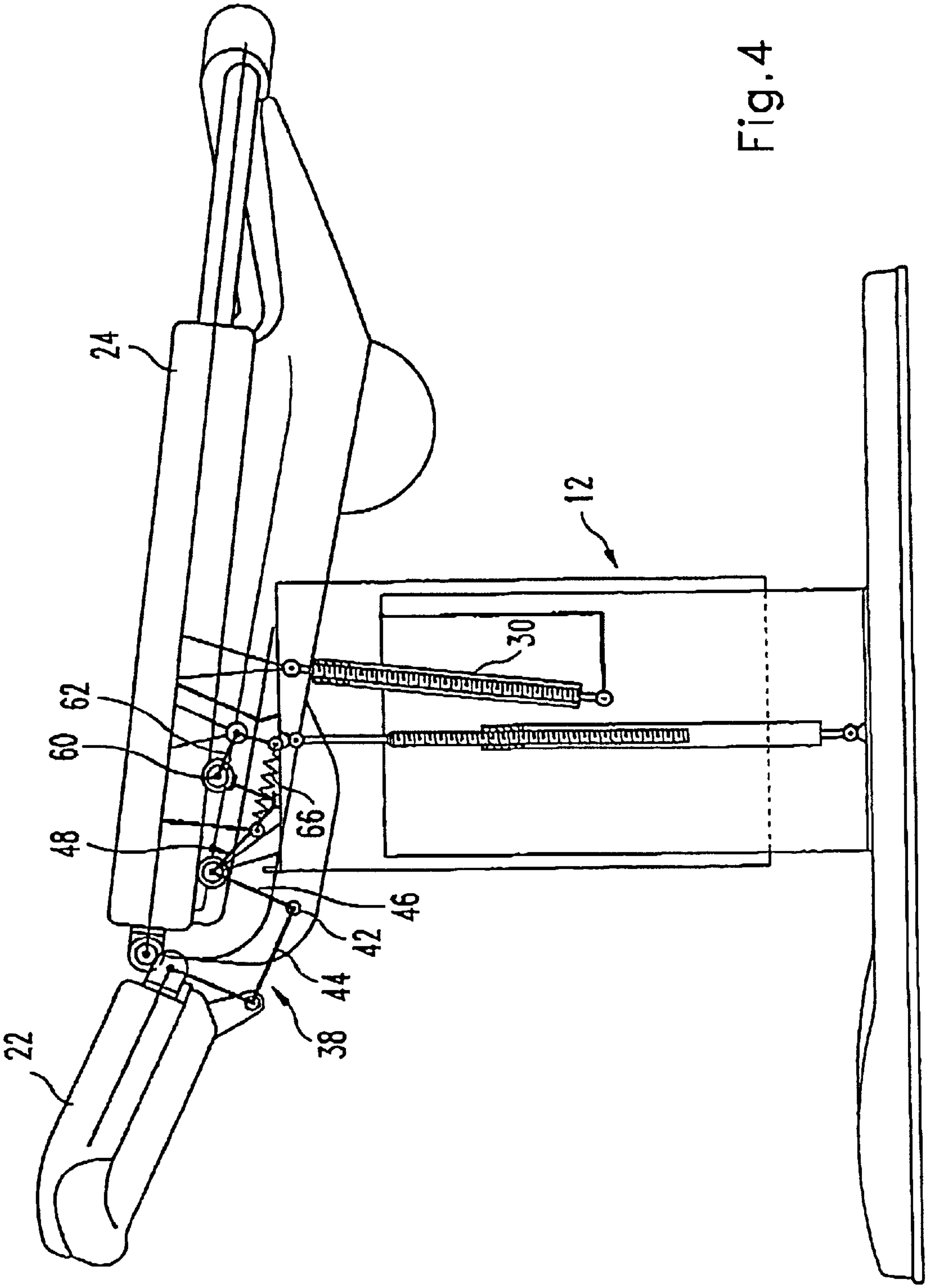
Figure 5:
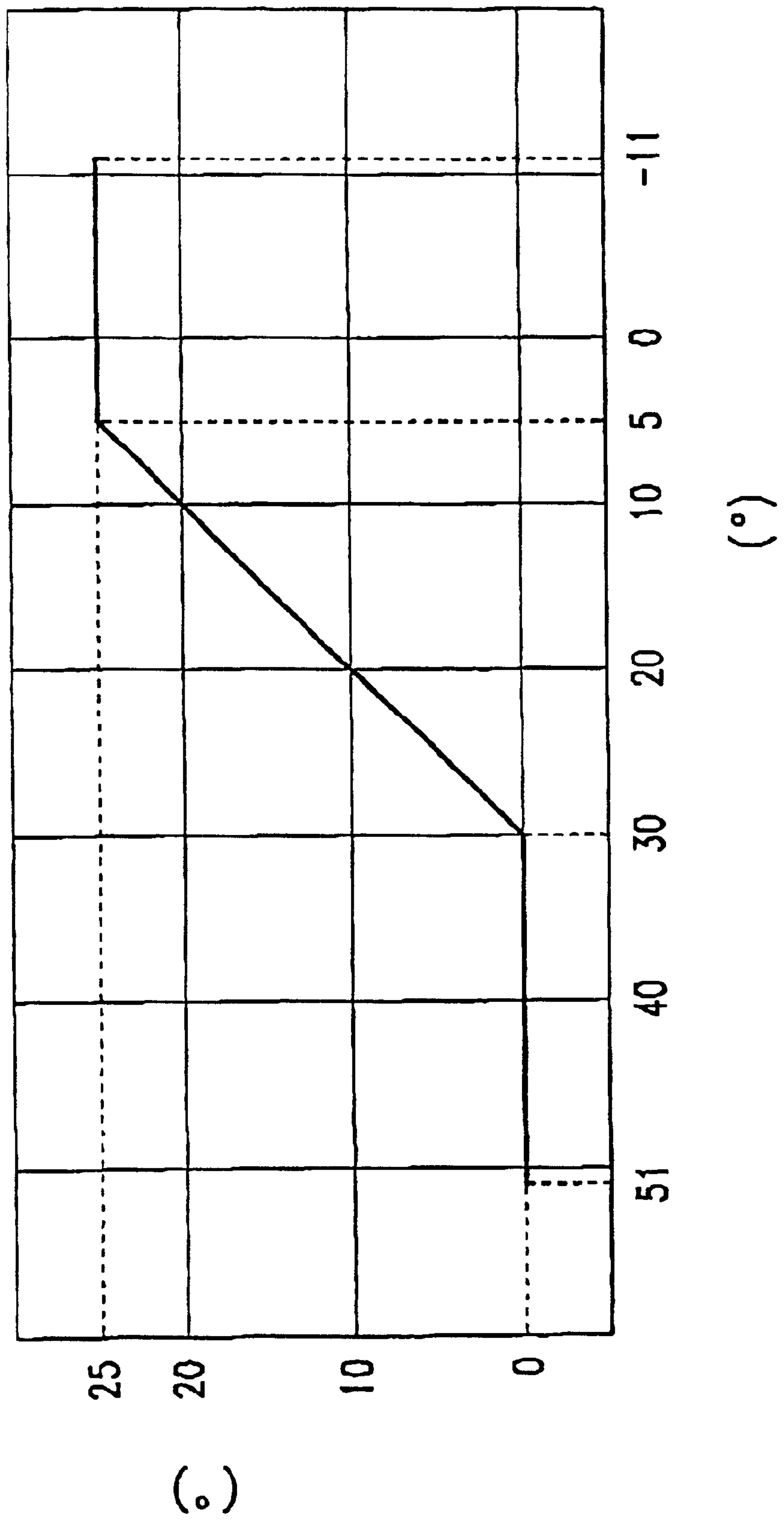

Because of the spring biased support of the stop 60 on the backrest, the backrest 24 can however be further pivotally moved by itself in the clockwise direction to the position illustrated in FIG. 4, in which the backrest 24 and the seat 22 lie at least nearly in a common plane. For this the compression spring 66 is compressed. The adjustment process in the counterclockwise sense runs in the reverse sequence until the backrest and seat again reach the position illustrated in FIG. 1, from which position the backrest also can be further pivoted in the counterclockwise direction until it reaches an upright position.

The diagram of FIG. 5 shows again the portions of the previously described adjusting movement with the angular values of the pivot angle of the backrest and of the seat, as given by the abscissa and the ordinate, being freely selectable. For a pivotal movement of the backrest out of the angular position 51° (FIG. 1) to the angular position 30° (FIG. 2) the seat 22 remains horizontal. It is only shifted in the horizontal direction. For a further pivotal movement of the backrest 24 from the angular position 30° to the angular position 5° (FIG. 3) the seat 22 is also pivoted in the same angular amount (in total 25°), until the position in FIG. 3 is reached. With further angular movement of the backrest out of the angular position 5° (FIG. 3) to the angular position minus 11° (FIG. 4) the seat 22 again holds its angular position.

An essential advantage of the solution of the invention lies not only in that with the help of a single adjusting drive the seat and the backrest can be adjusted in common to different positions, but also in that the seat 22 can always be freely swung upwardly if during a lowering of the column head 18 the seat comes into engagement with an obstacle. Thereby, it is avoided that with the lowering of the column head 18 persons can be become clamped between the floor or the base part 10 and the seat 22.

We claim:

1. An examination chair, especially for gynecological and urological examinations, including:

a chair part with a seat and a backrest;

a support column having a column head being vertically adjustable by an adjusting drive wherein, the chair part is arranged on the column head, means for adjusting the seat and the backrest relative to the supporting column, wherein the backrest is both pivotally supported on the column head for movement about a horizontal first pivot axis and pivoted by a pivot drive, so that the seat is supported on the backrest for pivotal movement about a second pivot axis substantially parallel to the first pivot axis and is further connected with the backrest through a four-corner linkage including the two pivot axes, with a linkage axis fixed to the seat and a free linkage axis; whereby a link of the four-corner linkage connects the first pivot axis with the free linkage axis defining a first lever arm of a pair of lever arms in order to cooperate with a first stop fixed to the support column for establishing a fundamental position of the seat, with a second lever arm of the lever arms for adjusting the seat being designed for cooperation with a second stop on the backrest.

2. The examination chair according to claim 1, wherein the pivotal movement of the level arms out of its position which corresponds to a fundamental position of the seat is limited by a second stop fixed to the column head and that the stop on the backrest is deflectable against a spring force.

3. An The examination chair according to claim 1 or 2, wherein the pivot drive is a linear drive having one end connected to the column head and another end pivotally connected with the backrest.

* * * * *